(12) United States Patent
Masarwa et al.

(10) Patent No.: US 11,678,620 B2
(45) Date of Patent: Jun. 20, 2023

(54) IRRIGATION PIPE HAVING PROTRUDING STRENGTHENING MEMBERS

(71) Applicants: Netafim, Ltd., Tel Aviv (IL); Lorne Moshe Belford, Kibbutz Magal (IL)

(72) Inventors: Abed Masarwa, Taybi (IL); James Belford, Kibbutz Magal (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 16/395,590

(22) Filed: Apr. 26, 2019

(65) Prior Publication Data

US 2019/0246577 A1    Aug. 15, 2019

Related U.S. Application Data

(63) Continuation of application No. PCT/IB2017/056585, filed on Oct. 24, 2017.

(60) Provisional application No. 62/413,042, filed on Oct. 26, 2016.

(51) Int. Cl.
| | |
|---|---|
| A01G 25/02 | (2006.01) |
| F16L 9/00 | (2006.01) |
| F16L 9/127 | (2006.01) |
| F16L 11/06 | (2006.01) |
| F16L 11/12 | (2006.01) |

(52) U.S. Cl.
CPC ........... *A01G 25/023* (2013.01); *A01G 25/02* (2013.01); *F16L 9/006* (2013.01); *F16L 9/127* (2013.01); *F16L 11/06* (2013.01); *F16L 11/12* (2013.01)

(58) Field of Classification Search
CPC ....... A01G 25/023; A01G 25/02; F16L 9/006; F16L 9/127; F16L 11/06; F16L 11/12

USPC ........................................................ 239/542
See application file for complete search history.

(56) References Cited

U.S. PATENT DOCUMENTS

| | | | | |
|---|---|---|---|---|
| 3,779,468 A | * | 12/1973 | Spencer | A01G 25/02 138/45 |
| 3,874,597 A | * | 4/1975 | Stephens | A01G 25/023 239/542 |
| 4,210,287 A | | 7/1980 | Mehoudar | |
| 4,273,286 A | * | 6/1981 | Menzel | F16L 41/00 239/272 |
| 5,141,360 A | | 8/1992 | Zeman | |
| 5,224,796 A | | 7/1993 | Zeman | |
| 2002/0088877 A1 | | 7/2002 | Bertolotti et al. | |
| 2003/0057301 A1 | | 3/2003 | Cohen | |
| 2003/0150940 A1 | | 8/2003 | Vildibill et al. | |
| 2009/0173811 A1 | * | 7/2009 | Gorney | A01G 25/023 239/542 |

OTHER PUBLICATIONS

International Search Report dated Apr. 5, 2018, in counterpart International (PCT) Application No. PCT/IB2017/056585.
Written Opinion dated Apr. 5, 2018, in counterpart International (PCT) Application No. PCT/IB2017/056585.
European Search Report dated Nov. 3, 2022, in counterpart European Application No. 22172102.0.

* cited by examiner

*Primary Examiner* — Christopher S Kim
(74) *Attorney, Agent, or Firm* — Womble Bond Dickinson (US) LLP

(57) ABSTRACT

An irrigation pipe that extends along an axis and has a pipe wall with a base portion (55) and a plurality of bulge members (1, 2) that extend away from the base portion.

37 Claims, 8 Drawing Sheets

IRRIGATION PIPE HAVING PROTRUDING STRENGTHENING MEMBERS

RELATED APPLICATIONS

This is a Bypass Continuation of PCT/M2017/056585 filed Oct. 24, 2017, and published as WO 2018/078521, which claims priority to U.S. Provisional Patent Application No. 62/413,042 filed Oct. 26, 2016. The contents of the aforementioned applications are incorporated by reference in their entirety.

TECHNICAL FIELD

Embodiments of the invention relate to irrigation pipes, possibly drip irrigation pipes.

BACKGROUND

Irrigation systems deliver liquid comprising water, often containing plant nutrients, pesticides and/or medications, to plants via networks of irrigation pipes.

Relative thin walled irrigation pipes, sometimes called tapes, may be used for irrigation, for example when the irrigation pipes are used for short durations of time, such as a single season and then possibly disposed.

During installment or use, the irrigation pipes may be exposed to wear and tear that may cause damage to the pipes in particular in cases where the irrigation pipe has a relative thin wall.

Irrigation pipes may deliver liquid to plants via emitters or drippers that are installed on or integrated inside the irrigation pipes. Such emitters may be heat bonded to the pipe to form a so-called drip irrigation pipe or dripper pipe.

In some cases such dripper pipes may be susceptible to damage at the areas of bonding and/or areas of connection to the drip emitter.

SUMMARY

The following embodiments and aspects thereof are described and illustrated in conjunction with systems, tools and methods which are meant to be exemplary and illustrative, not limiting in scope.

In an embodiment, there is provided an irrigation pipe extending along an axis and comprising a pipe wall, wherein the pipe wall comprises a base portion and a plurality of bulge members extending away from the base portion. The bulge members may be ribbed shaped, possible extending along the pipe axis upon inner and/or outer faces of the pipe wall.

In an embodiment, the base portion may have a substantial constant thickness and each bulge member increases thickness of the pipe wall at the location where it is formed, preferably in a radial direction (inwards or outwards) when the pipe is held in a general cylindrical state.

Such increase in wall thickness may be defined as occurring "locally" where the bulge is formed, while at locations absent of bulges, pipe material may be absent between adjacent bulges in a peripheral direction, thus forming valleys, possibly axially extending valleys between adjacent bulges. Such valleys may have relatively large lateral extensions when placed between bulges that a far apart in a peripheral direction.

In an embodiment, for a pipe having a base portion thickness T less than about 0.254 millimeters (10 mil), at least some of the bulge members may have a height that extends radially away from the base portion up to about 0.254 millimeters (10 mil) minus T. Choice of height for a bulge member may be in order to 'as if "upgrade" wall thickness of a pipe (at least locally where ribs/bulges are formed). Thus, bulge/rib height may be chosen to at least locally increase wall thickness of a 5 mil pipe to a 6 mil, 7 mil pipe category and so on.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
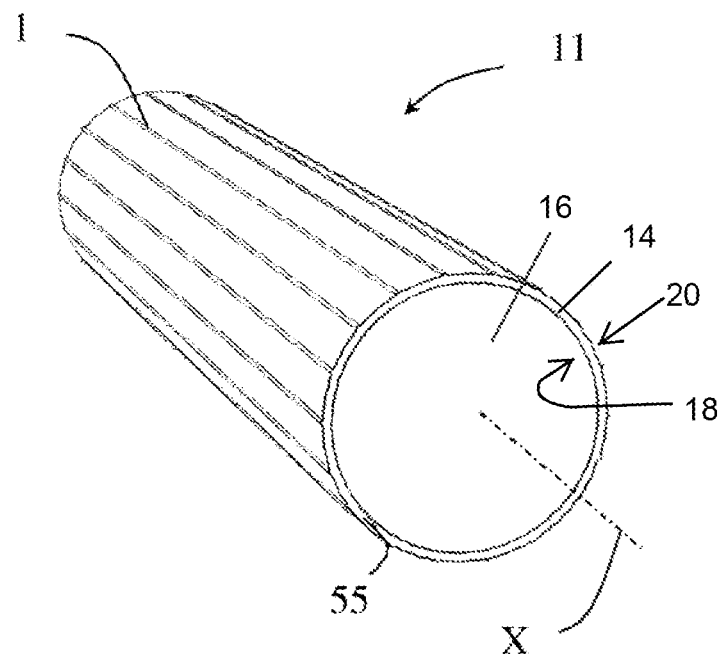
FIGS. 1 to 3 schematically show irrigation pipes according to various embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
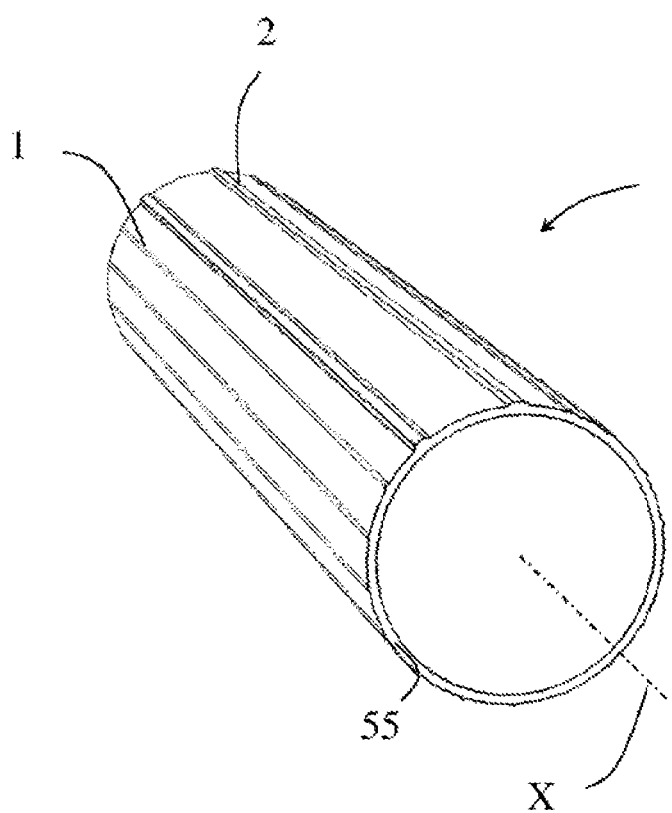
Figure 3:
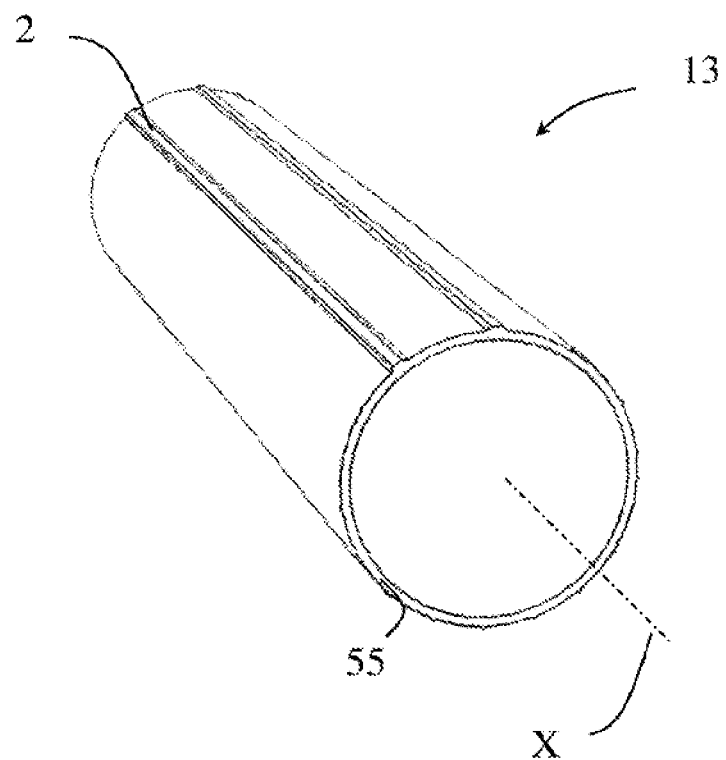

Attention is first drawn to FIGS. 1 to 3 illustrating each an embodiment of an irrigation pipe 11, 12, 13 according to the present invention. Each one of the pipes extends along an axis X and is formed thereabout.

The embodiment of pipe 11 in FIG. 1 is illustrated including a pipe wall 14 having a peripheral base portion 55 of substantial contact thickness T (see thickness T illustrated in FIG. 4A) and a plurality of axially extending bulge members 1 here in the form of elongated rib-like structures that extend above the base portion in an outer radial direction when the pipe is held generally cylindrical. The peripheral base portion 55 of the pipe wall 14 defines a passage 16 about the central longitudinal axis X as the pipe wall 14 extends in a direction along axis X. The base portion 55 has an inner face 18 and an outer face 20 opposite the inner face 18. The inner face 18 is directed towards and surrounds the passage 16 to form an interior surface of the pipe wall 14 defining the passage. The outer face 20 facing away from the passage 16 forms an exterior surface of the pipe wall 14. The members 1 are here optionally formed about axis X, preferably extending each generally parallel to axis X. In an embodiment (not shown), the bulge members 1 may be formed helically about axis X or any other suitable configuration.

The embodiment of pipe 12 in FIG. 2 is illustrated including a plurality of axially extending bulge members 1 generally similar to those of pipe 11. Pipe 12 is here seen also including additional bulge members 2, here two such members, formed on base portion 55, which have a larger cross sectional area than members 1 in a cross section perpendicular to axis X.

The bulge members 2 are here also shown possibly extending continuously along an outer face of the pipe each having an elongated rib-like structure and formed about axis X, preferably extending each generally parallel to axis X. In addition, adjacent bulge members 2 as shown here may have a larger circumferential spacing therebetween about axis X than the members 1. In an embodiment (not shown), the bulge members 2 may be formed helically about axis X or any other suitable configuration.

With attention drawn to FIG. 3 an embodiment of a pipe 13 is shown including possibly only bulge members 2 generally similar to those seen in FIG. 2. Here only two such bulge members 2 are shown and the remaining outer face of the wall's base portion 55 is shown possibly devoid of bulging structures that are formed thereon.

Pipe embodiments that may not be shown, however come within the scope of the present disclosure, should be understood to include various combinations of bulge members generally similar to those discussed herein, e.g. bulge members 1, 2 or those discussed below in FIGS. 5 and 6.

At least some of the suitable pipes including bulge members as discussed herein may be relative thin walled pipes, sometimes called 'tapes'. Such a thin walled pipe structure may be characterized by a wall thickness (at locations not including a bulge) that may range from about 0.127 (5 mil) to about 0.254 millimeters (10 mil) (measured in a radial direction on a pipe held in a cylindrical state).

Such relative thin wall thickness may render the pipes relative weak to wear and tear that may occur during use in an irrigation application and thus susceptible to damage. Therefore, in such thin walled pipes the bulge members may serve to strengthen the pipe wall and increase its resistance and robustness to damage during use e.g. when laid in a field for irrigation purposes.

Pipes including bulge members as discussed herein may however not necessarily be only of a relative thin walled type, but may be of also larger wall thickness. In such relative larger wall thickness pipe (as also in thin walled pipes), the bulge members may serve as deposits of pipe material for strengthening certain areas of the pipe that may be susceptible to damage.

Such areas of the pipe susceptible to damage may include a lower side of the pipe exposed to a ground face when laid in a field, or a side of the pipe exposed to friction from machinery used for laying the pipes in the field (etc.). In one example, such bulges may also strengthen locations of the pipe where other devices may be mounted.

Figure 4A:
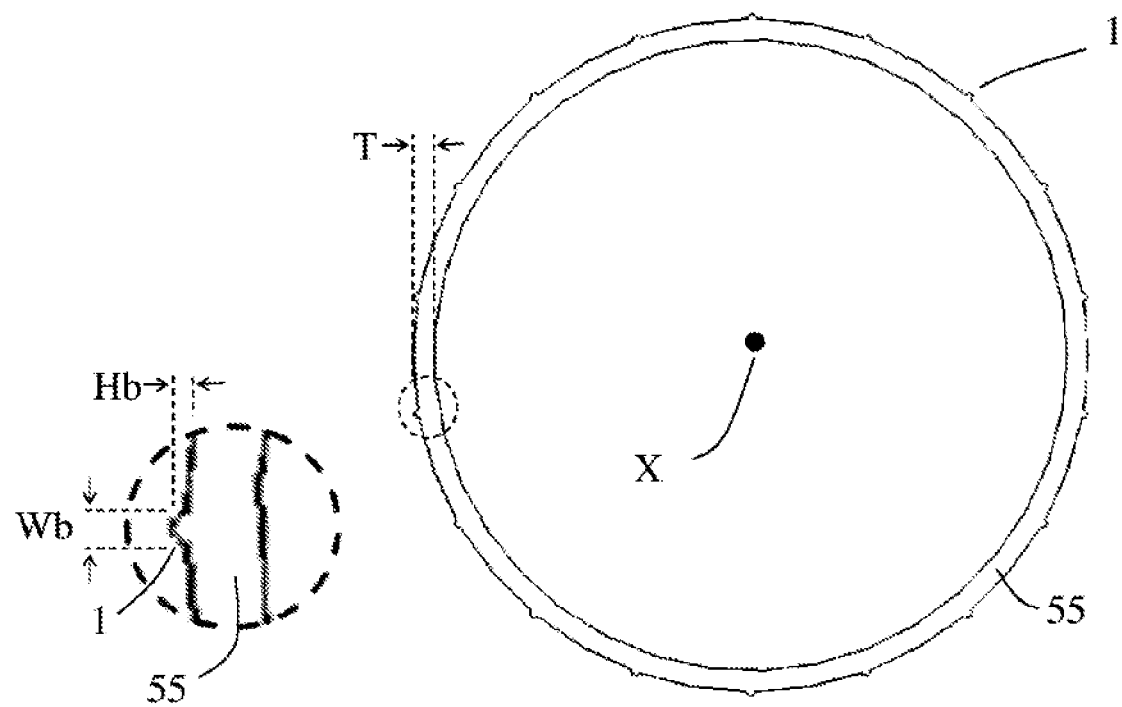
FIGS. 4A and 4B schematically show each a cross sectional view of an irrigation pipe according to an embodiment of the invention, respectively, without or with a drip emitter mounted thereto.

Attention is drawn to FIG. 4A showing a cross sectional view taken in a plane perpendicular to axis X of a pipe generally similar to the above discussed pipes. In this example, the cross section is taken on pipe 11 showing its bulge members 1 being circumferentially spaced apart about axis X.

Figure 4B:
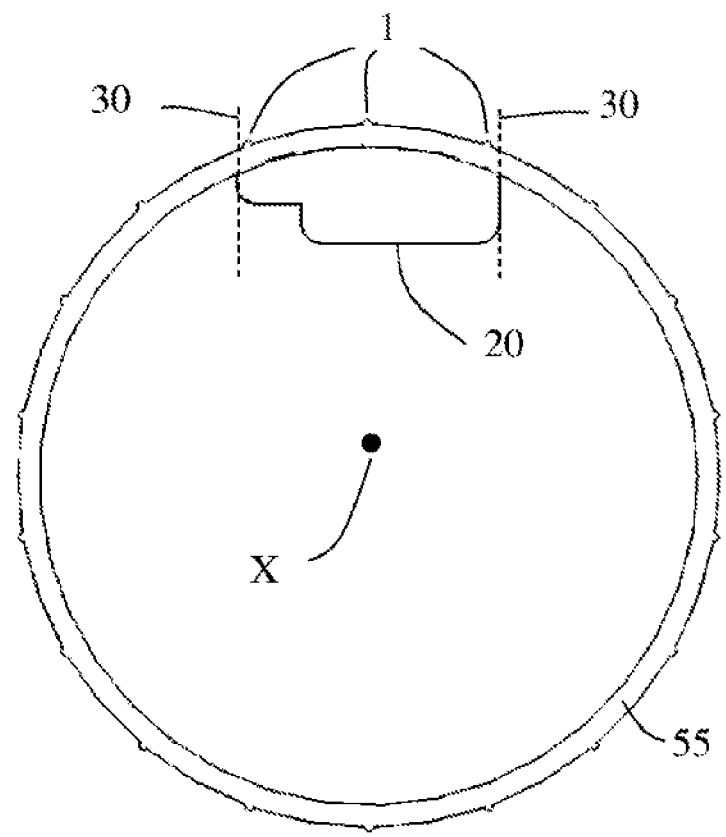

Attention is drawn to FIG. 4B showing a cross sectional view taken in a plane perpendicular to axis X of a pipe generally similar to the herein discussed pipes. In this example, the cross section is taken on pipe 11 showing its bulge members 1 being circumferentially spaced apart about axis X. In addition, in this view the pipe is shown including a device, here a drip emitter 20, mounted to its inner side.

In an aspect of the present disclosure, bulge members positioned above a location where the drip emitter is mounted to the pipe may be useful in providing additional protection to this area, which may be susceptible to damage. As an example, a drip pipe may be installed in a field by directing the pipe through a framework of an agricultural machine (not shown) towards the ground face. During process, such as this, areas of the pipe that include devices within them, such as a drip emitter, may form bumps in the pipe e.g. when the pipe is flattened, which may in turn increase friction against the framework of the agricultural machine.

Consequently, an embodiment a drip pipe (as illustrated in FIG. 4B) may include at least one bulge member located between opposing lateral sides 30 of the drip emitter. In the shown example, bulge member 1 is shown located between the lateral sides 30 however other rib members such as those described herein may be used for protecting the drip pipe. In the shown example three such bulge members 1 are illustrated located between sides 30, however fewer than three (such as one) or more than three bulge members may be placed between the sides 30 of the drip emitter.

Attention is drawn to FIGS. 5A to 5F showing various types of bulge member configurations that may be used, where these cross-sectional views represent either an irrigation pipe without any device (e.g. drip emitter) mounted thereto or a cross sectional view taken axially in-between adjacent devices (such as drip emitters) at a location where the device is absent.

Figure 5A:
FIG. 5A to 5F schematically show each a section of an irrigation pipe generally similar to those in FIG. 4A or 4B and illustrating various exemplary irrigation pipe or drip irrigation pipe embodiments of the invention.

In FIG. 5A pipe embodiments are shown including bulge members on the outer side of the wall's base portion 55, which appear generally similar to the bulge member 2 shown in FIGS. 2 and 3. On the left hand side of FIG. 5A, a pipe embodiment 161 is shown including bulge members illustrated as possibly having the same material of the pipe; and on the right hand side of FIG. 5A, a pipe embodiment 162 is shown including bulge members illustrated as possibly having a different material to that of the pipe.

Figure 5B:

In FIG. 5B pipe embodiments are shown including bulge members on the inner side of the wall's base portion. On the left hand side of FIG. 5B, a pipe embodiment 171 is shown including bulge members illustrated as possibly having the same material of the pipe; and on the right hand side of FIG. 5B, a pipe embodiment 172 is shown including bulge members illustrated as possibly having a different material to that of the pipe.

Figure 5C:

In FIG. 5C pipe embodiments are shown including bulge members on both the inner and outer sides of wall's base portion. On the left hand side of FIG. 5C, a pipe embodiment 181 is shown including bulge members illustrated as possibly having the same material of the pipe; and on the right hand side of FIG. 5C, a pipe embodiment 182 is shown including bulge members illustrated as possibly having a different material to that of the pipe.

Figure 5D:

In FIG. 5D pipe embodiments are shown including bulge members on the inner side of the wall's base portion, here formed as strips having a relative large circumferential extension. On the left hand side of FIG. 5D, a pipe embodiment 191 is shown including such bulge member or strip having a circumferential extension extending along an arc of about 45 degrees. On the right hand side of FIG. 5D, a pipe embodiment 192 is shown including such bulge member or strip having a larger circumferential extension possibly formed on the full inner circumference of the pipe.

Figure 5E:

In FIG. 5E pipe embodiments are shown having strip-like structures generally similar to those in FIG. 5D with additional bulge members possibly similar to bulge 2 mounted on-top of the strips. On the left hand side of FIG. 5E, a pipe embodiment 201 is shown including bulge members formed on a strip generally similar to that on the left hand side of FIG. 5D. On the right hand side of FIG. 5E, a pipe embodiment 202 is shown including bulge members formed on a strip generally similar to that on the right hand side of FIG. 5D.

Figure 5F:
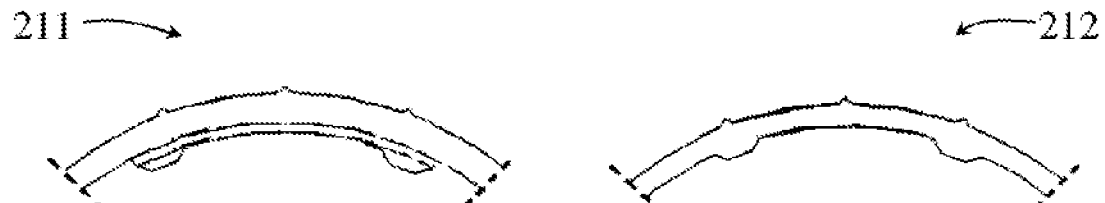

In FIG. 5F pipe embodiments are shown including both inner and outer bulge members. On the left hand side of FIG. 5F, a pipe embodiment 211 is shown including outer bulge members 1 generally similar to those in FIG. 4A and inner bulge members here exemplary shown as those on the left hand side of FIG. 5E. On the right hand side of FIG. 5F, a pipe embodiment 212 is shown including outer bulge members 1 generally similar to those in FIG. 4A and inner bulge members here exemplary shown generally similar to those in FIG. 5B.

In embodiments having a bulge member made of a different material than the wall's base portion (e.g. pipes 162, 172, 182), the material of these bulge members may be more elastic and/or soft than the remainder of the wall's base portion. By way of an example, an irrigation pipe having a base portion made of polyethylene material i.e. typically High-density polyethylene (HDPE), Medium-density polyethylene, or the like—may include bulge member(s) made of Low-density polyethylene (LDPE), Linear low-density polyethylene (LLDPE), or the like.

Attention is drawn to FIGS. 6A to 6D illustrating generally similar pipes 1161, 1162, 1171, 1172 (etc.) to those in FIGS. 5A to 5D, respectively—however here shown including a drip emitter mounted to the inner side or face of the wall's base portion. Lateral sides of each drip emitter are here marked by the upright 'dashed lines' and as seen, each lateral side is possibly generally overlaid by a bulge member.

Figure 6A:
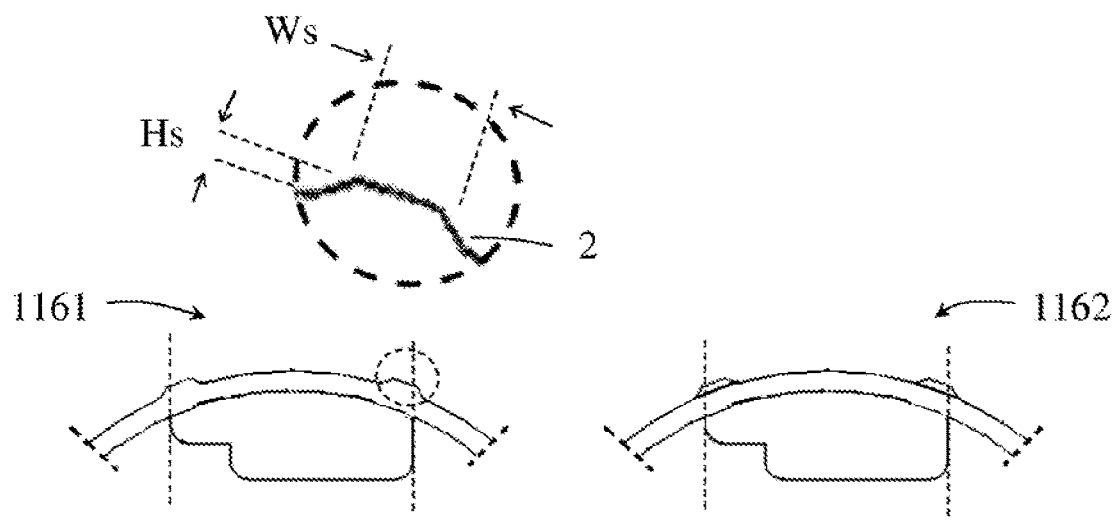
FIGS. 6A to 6E schematically show each a section of an irrigation pipe generally similar to those in FIG. 4A or 4B and illustrating various exemplary irrigation pipe or drip irrigation pipe embodiments of the invention.
Figure 6B:
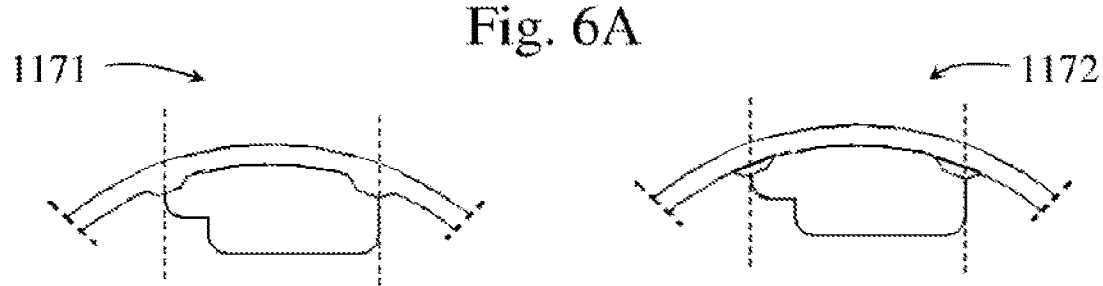
Figure 6C:
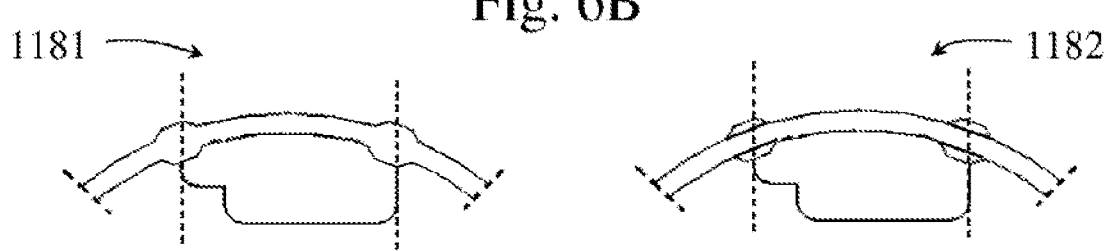
Figure 6D:
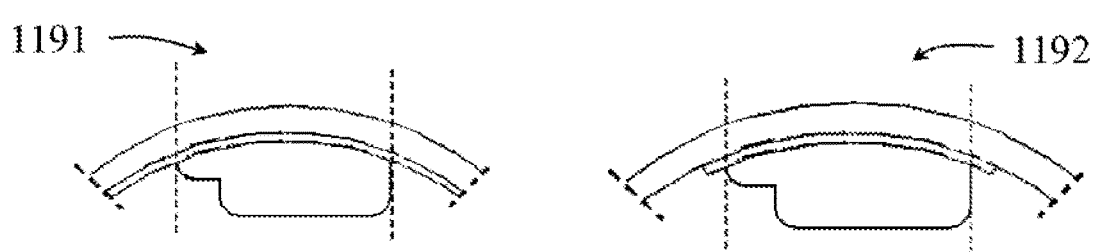
Figure 6E:
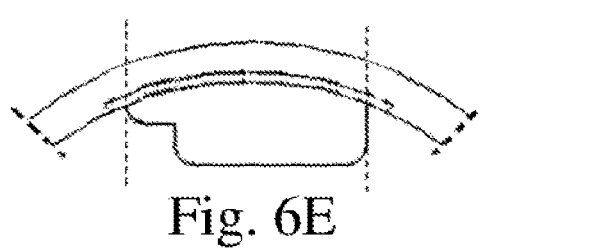

Strips of material illustrated in e.g. pipe embodiments 1192, 1191 in FIG. 6D, which are located on inner sides of the pipe's base portion and hence in contact with drip emitters bonded to the inner side of the pipe; may be formed from a material more suitable for bonding to an emitter that is fitted to the pipe, than e.g. the remainder of the material of the pipe's wall e.g. in the pipe's base portion. FIG. 6E further illustrates an irrigation pipe embodiment 1193 including a strip of material embedded within and/or flush with the pipe wall's base portion. Such strip may be formed from a material that is more suitable for bonding to an emitter that is fitted to the pipe, than e.g. the remainder of the material of the pipe's wall e.g. in the pipe's base portion.

Improved suitability of material (such as of the strips in pipe embodiments 1191, 1192, 1193) for bonding to an emitter may be due to the strip having an MFI (Melt Flow Index) that is generally higher than the MFI of the remainder of the pipe wall e.g. in the pipe's base portion; and generally lower than the MFI of the material of the drip emitter bonded thereto. For example, for a drip pipe having a strip with an MFIs, a base portion with an MFIb and a drip emitter with an MFId—the relation of these MFI's may satisfy a ratio: MFIb<MFIs<MFId. In a non-binding example, thickness of the strip in at least certain embodiments may be from about 50 micrometers and up to about 15% of an overall thickness of a pipe wall (e.g., including the base portion).

FIGS. 7A to 7H illustrate various irrigation pipe and/or drip pipe embodiments. At the upper right hand side of FIG. 7A, a so-called 'tape' like thin walled drip pipe is illustrated in a flattened formation, where the drip emitter fitted to the pipe is located in-between two folds 17 formed in the pipe's wall. Such flattened shape resulting in the formation of the folds 17 may be created during a manufacturing process of such 'tapes', by intentionally flattening the pipe in order to perform certain procedures to the pipe, such as punching holes through the pipe.

Figure 7A:
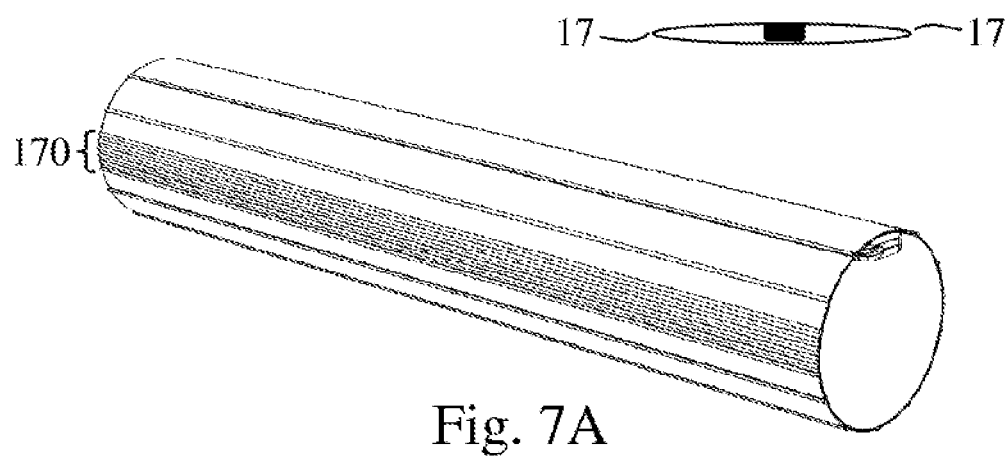
FIGS. 7A to 7H schematically show irrigation pipes and/or drip pipes according to various embodiments of the present invention.

In the pipe embodiment at the bottom of FIG. 7A, groups 170 of ribs (one possible group at the far side of the pipe is hidden) are configured to be placed adjacent locations about the pipe's wall where such folds occur in order to strengthen these areas. In addition, the pipe in FIG. 7A is seen including additional ribs, such as ribs located along lateral sides of the emitter(s).

Figure 7B:
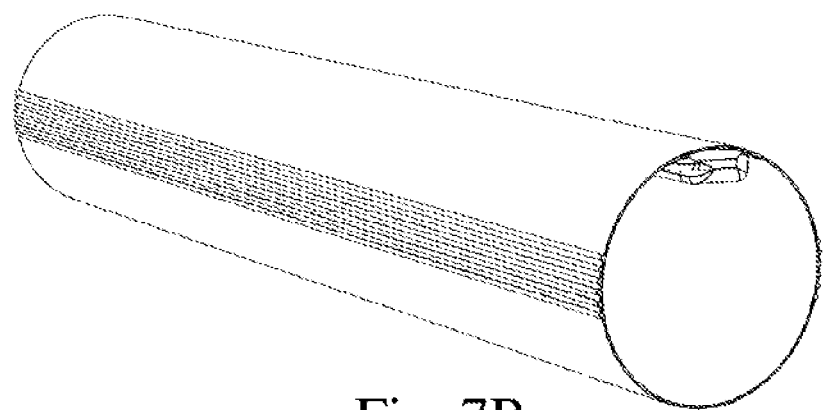
Figure 7C:
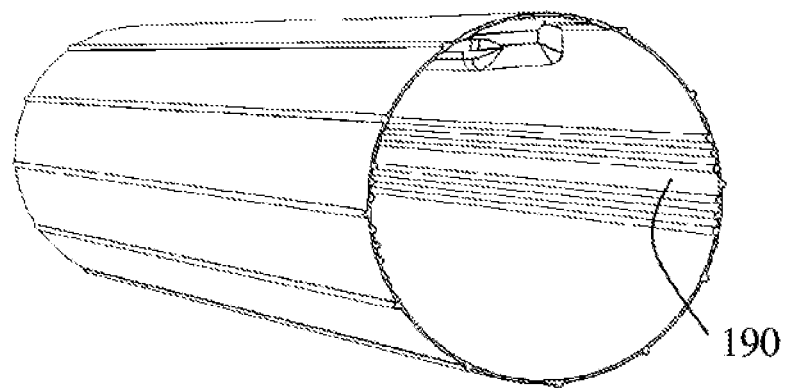

In FIG. 7B, a pipe embodiment only including such rib groups possibly at areas where folds are configured to occur, are illustrated. In FIG. 7C, such rib groups are configured to be placed on an inner side of the pipe wall (projecting inwardly from the pipe's base portion). Here, a possible gap 190 is formed within the rib group in order to urge the folds to occur within the strengthened area of the pipe wall i.e. within the rib groups. Additional possible ribs are here shown formed upon the base portion of the pipe's wall.

Figure 7D:
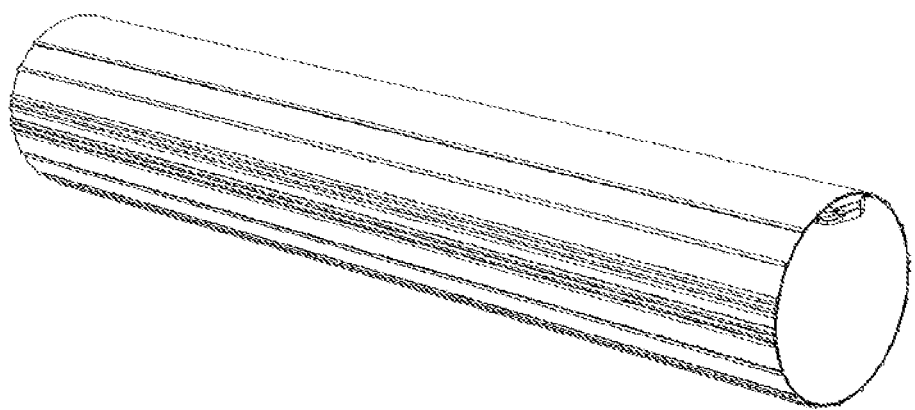
Figure 7E:
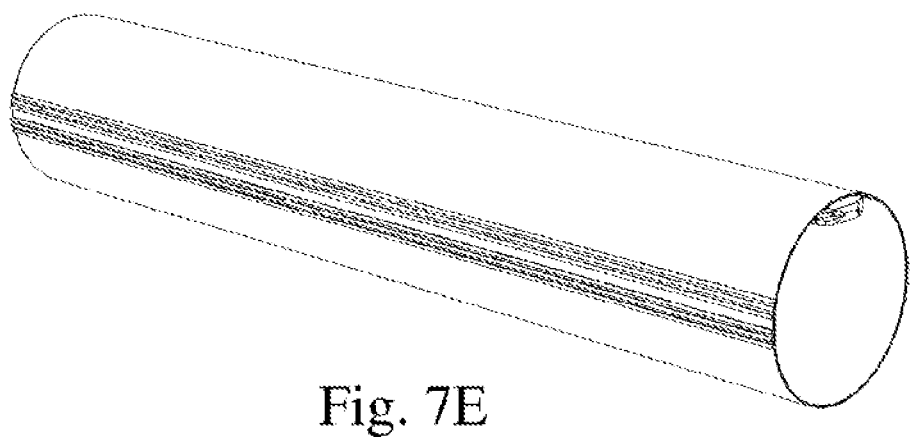
Figure 7F:
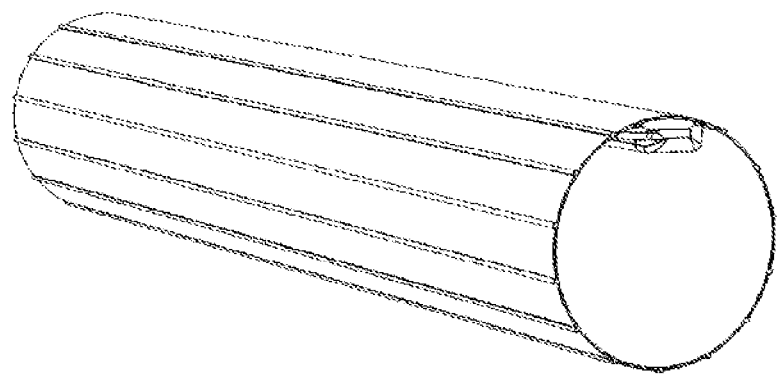

FIGS. 7D and 7E illustrate further examples of pipe embodiments again including rib groups and possible additional ribs. FIG. 7F illustrates a pipe embodiment with ribs evenly distributed about its periphery, possibly like the embodiments seen in FIGS. 1 and 4.

Figure 7G:
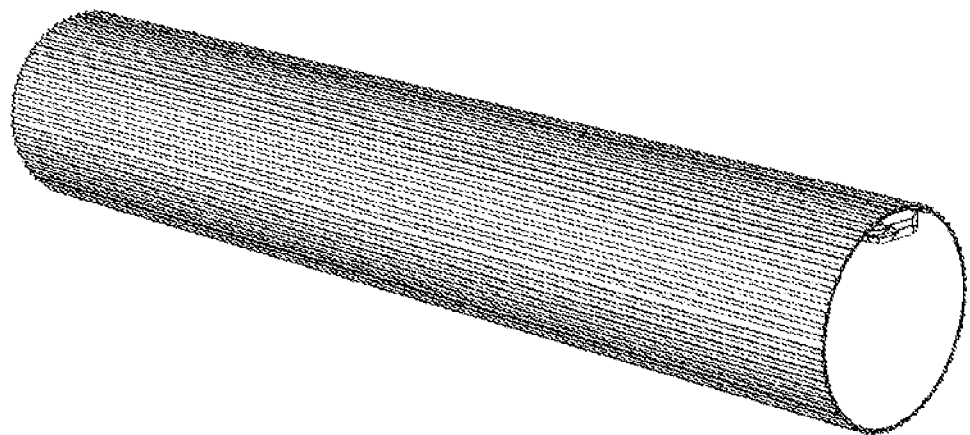
Figure 7H:
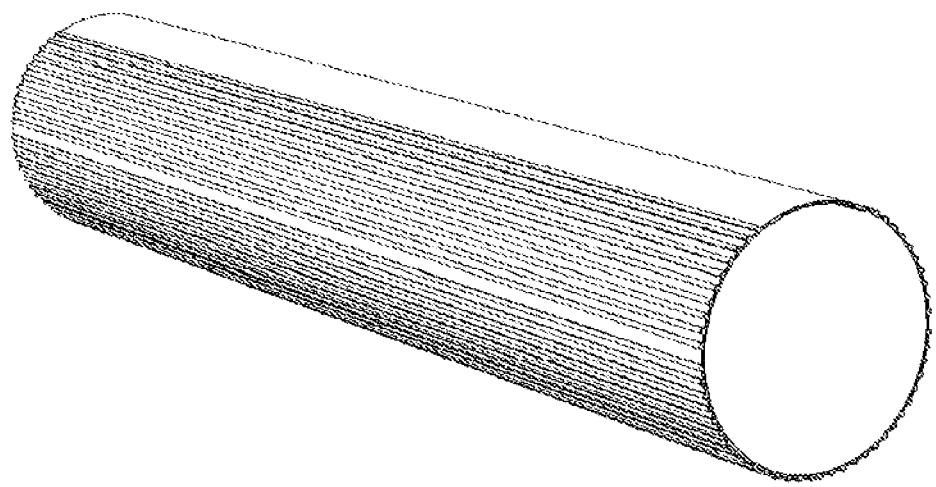

FIG. 7G illustrates a pipe embodiment with adjacently located ribs formed about the pipe's periphery, with such ribs possibly being spaced apart by a distance generally similar to a rib width. FIG. 7H illustrates a pipe embodiment generally similar to that in FIG. 7G, however with ribs being absent along a segment about the pipe's periphery, possibly a segment along which drip emitters may be fitted to the inner side of the pipes wall. The distances here between adjacent ribs also appear slightly larger, for example equal to combined widths of two or more ribs.

Typically, mounting of a drip emitter to an inner side of an irrigation pipe to form a so-called drip pipe, may be performed by heat bonding. Such heat bonding may be performed during production of a drip pipe, by contacting a drip emitter to the hot melt of a pipe as the pipe exits an extruder and prior to solidification of the pipe wall. Possibly, also the drip emitter may be pre-heated in some cases to assist in the heat bonding to the pipe wall.

The area of contact between a drip emitter and a pipe wall may be susceptible to damage e.g. formation of cracks in the pipe wall, in some cases due to shear forces applied between the emitter and pipe during production or during later use. Such damage may be concentrated in some cases along locations in the pipe that overlie the lateral sides of the drip emitter.

Therefore, the bulge members may be seen in at least some embodiments also as "deposits" of excess material for increasing strength at 'strategic' locations where damage to the pipe wall may be expected to occur, such as in the shown embodiments along the lateral sides of the drip emitters. For example, during heat bonding of a drip emitter to a hot melt of a pipe wall, a bulge member being extruded together with the pipe's base portion or co-extruded upon the pipe's base portion may assist in providing additional material for increasing contact and consequently strength of bonding between the emitter and pipe. Such bulge members may also melt during the heat bonding process and may be designed to flow towards locations where additional strength to the pipe wall is required.

Bulges sufficient for providing "robustness" to drip irrigation pipes, such as thin-walled pipes or tapes, according to at least some embodiments of the invention may be defined as including a bulge height extending above the pipe's base portion that may be between about 100 to about 300 micro-meters, possibly between about 100 to about 200 micrometers. In some cases, a bulge height extending above the pipe's base portion may be from as low as about 25 or 50 micro-meters and higher (possibly up to about 300 micro-meters). In the enlarged section provided at the lower left hand side of FIG. 4A, such bulge, here being bulge 1, is illustrated extending a bulge height here marked as Hb above the pipe's base portion 55 having a value of between about 25 to about 300 micro-meters, possibly between about 100 to about 300 micro-meters, and further possibly between about 100 to about 200 micro-meters.

Pipe "robustness" may here refer to increased resistance of a pipe to failure and/or damage in agricultural applications such as when laying a pipe in a field or the like. Preferably, circumferential distribution of such bulges, possibly in a symmetrical manner, about the pipes' axis X—typically on an outer face of the pipe's base portion may be required for providing such "robustness". A bulge width Wb of such bulge, as bulge 1, for providing "robustness" may similarly be within a range generally identical to about 100 to about 300 micro-meters, possibly between about 100 to about 200 micro-meters.

Bulge dimensions possibly suitable for providing additional deposits of material for locally "strengthening" certain areas of a pipe (e.g. due to bonding of a drip emitter thereto) and/or for providing "robustness" to a pipe (e.g. increased resistance to pipe failure and/or damage); may be defined in at least some embodiments of the invention as following. In one approach, pipes having relatively large wall thickness, such as a base wall thickness T reaching up to about 0.254 millimeters (10 mil)—may be considered as being generally less susceptible to damage—such as that which may occur due to shear forces acting e.g. along lateral sides of drippers bonded to thinner walled pipes.

Thus, in accordance with such approach—a pipe having a relatively thin wall thickness T may be configured to include locally "strengthening" and/or "robust" bulges, such as the bulges 2 and/or 1 illustrated in FIGS. 1, 2 and 3 (see especially bulge 2 and bulge 1 in the enlarged section, respectively, of FIGS. 6A and 4A), that extend a height Hs (for bulge 2) and a height Hb (for bulge 1) away from the pipe's base portion. Such bulges in preferred embodiments may be defined as having heights of at least up to a value of about 0.254 millimeters (10 mil) minus T in order to provide an overall local pipe thickness of up to about 0.254 millimeters (10 mil).

By way of an example, a pipe having a base portion thickness T of about 0.127 millimeters (5 mil) may be configured to include one or more locally "strengthening" and/or "robust" bulge(s) having a height extending away from the pipe's base portion of up to about 0.127 millimeters (i.e. 0.254 minus 127 millimeters) in order to sufficiently locally "strengthen" and/or increase "robustness" of the pipe.

In a slight variance to the above approach, non-ribbed thin walled pipes conventionally offered in so-called 'thicknesses categories' of e.g. about 0.127 millimeter (5 mil), 0.1524 millimeter (6 mil), 0.1778 millimeter (7 mil), 0.2032 millimeter (8 mil), (and so on); by provision of ribs/bulges in accordance with various embodiments of the invention—may be 'upgraded' to a higher 'thickness category' consequently rendering the pipe "stronger" and/or more "robust". This may be achieved by suitably choosing the bulge height (e.g. Hs, Hb) to locally increase wall thickness of a thin-walled pipe to one or more higher categories of wall thickness.

In one example, a pipe having a wall thickness at its base portion of about 0.127 millimeters (5 mil); may be chosen to have ribs/bulges with heights of about 0.0254 millimeter to "bridge" the gap and "upgrade" the pipe to an about 0.1524 millimeters (6 mil) pipe category. In a further example, a pipe having a wall thickness at its base portion of about 0.127 millimeters (5 mil); may be chosen to have ribs/bulges with heights of about 0.0762 millimeters in order to "bridge" the gap and "upgrade" the pipe to an about 0.2032 millimeters (8 mil) pipe category.

A width Ws of locally "strengthening" bulges may in at least some pipe embodiments be defined according to manufacturing tolerances of such pipes. In a pipe, for example, including locally "strengthening" bulges for providing deposits of melt-able material adjacent lateral sides of drip emitters of the pipe, width Ws may be chosen to be in a magnitude generally similar to an expected tolerance of placement of the drippers about the pipe's axis.

By way of an example, in a manufacturing procedure where a drip emitter may have a tolerance of about two millimeters in its placement about the pipe's axis upon base portion 55, width Ws may be chosen to be generally similar to about two millimeters in order to compensate for such tolerance and ensure that the deposits of such locally "strengthening" bulge(s) is/are located at a suitable vicinity to the lateral sides of the drip emitters.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. An irrigation pipe extending along a central longitudinal axis (X) of the irrigation pipe, the irrigation pipe comprising:
    a pipe wall comprising:
        a base portion having an inner face and an outer face opposite the inner face, the inner face defining a passage about the central longitudinal axis (X); and
        a plurality of circumferentially spaced apart bulge members extending away from the outer face of the base portion, each bulge member of the plurality of bulge members defining a circumferential gap with the other bulge members of the plurality of bulge members; wherein
            each bulge member extends continuously in a direction along the central longitudinal axis; and
    a plurality of axially spaced drip emitters mounted within the passage, on the inner face.

2. The irrigation pipe of claim 1, further comprising a plurality of inner bulge members extending away from the inner face of the base portion.

3. The irrigation pipe of claim 1, wherein the base portion has a substantially constant thickness and each bulge member increases thickness of the pipe wall at the location where the bulge member is formed, the thickness being measured in a radial direction when the pipe is held in a general cylindrical state.

4. The irrigation pipe of claim 1, wherein at least one of the plurality of bulge members is located above the drip emitters.

5. The irrigation pipe of claim 1, wherein at least one of the plurality of bulge members is located generally above a peripheral lateral side of the drip emitters.

6. The irrigation pipe of claim 1, wherein:
    the pipe has a base portion thickness T less than about 0.254 millimeters, and
    one or more of the plurality of bulge members have a height that extends radially away from the base portion up to about 0.254 millimeters minus T.

7. The irrigation pipe of claim 6, wherein the bulge members are generally above peripheral lateral sides of the drip emitters.

8. The irrigation pipe of claim 1, wherein one or more of the plurality of bulge members are configured to provide robustness to the pipe, have a height of more than about 25 micro-meters in a direction radially away from the base portion, and a width of up to about 300 micro-meters in a peripheral direction about the axis (X).

9. The irrigation pipe of claim 1, wherein one or more of the plurality of bulge members in cross section have a lateral width of up to about 2 millimeters in a peripheral direction about the axis (X).

10. The irrigation pipe of claim 1, further comprising rib groups at spaced apart fold locations about the pipe wall, each rib group including a first bulge member and a second bulge member of the plurality of bulge members, the fold locations corresponding to locations where folds in the pipe wall are configured to occur when the pipe is flattened.

11. The irrigation pipe of claim 10, wherein the fold locations comprise a first fold location and a second fold location, the drip emitter being located between the first fold location and the second fold location.

12. The irrigation pipe of claim 1, wherein the bulge members are spaced apart from each other in a peripheral direction, with a pipe wall thickness in between immediately adjacent bulge members being a reduced wall thickness of the pipe's base portion.

13. The irrigation pipe of claim 1, comprising:
    a strip located on at least a portion of the inner face of the base portion facing into the pipe,
    the drip emitters are attached to the strip, and
    the material of the strip being different from the material of the base portion.

14. The irrigation pipe of claim 13, wherein the strip covers all the inner face of the base portion facing into the pipe.

15. The irrigation pipe of claim 13, wherein the strip covers only a portion of the base portion leaving inner portions of the base portion facing into the pipe in contact with fluid in the pipe.

16. The irrigation pipe of claim 13, wherein the strip is substantially embedded in the base portion and is flush with adjacent portions of the base portion that are exposed to fluid in the interior of the pipe.

17. The irrigation pipe of claim 1, wherein the plurality of bulge members includes a first bulge member, wherein in a cross-section of the irrigation pipe perpendicular to the axis (X) and intersecting one of the drip emitters, lateral ends of the one drip emitter extend on either side of the first bulge member.

18. The irrigation pipe of claim 17, further comprising a first inner bulge member and a second inner bulge member that extend away from the inner face of the base portion, wherein in said cross-section, the first and second inner bulge members are in contact with the one of the drip emitters.

19. The irrigation pipe of claim 18, wherein in said cross-section, the first and second inner bulge members are in contact with opposite lateral ends of the one of the drip emitters.

20. The irrigation pipe of claim 17, wherein:
    the pipe has a base portion thickness T less than about 0.254 millimeters, and
    the first bulge member has a height that extends radially away from the base portion up to about 0.254 millimeters minus T.

21. The irrigation pipe of claim 1, further comprising a first inner bulge member and a second inner bulge member that extend away from the inner face of the base portion, wherein in a cross-section of the irrigation pipe perpendicular to the axis (X) and intersecting one of the drip emitters, the first and second inner bulge members are in contact with the one of the drip emitters.

22. The irrigation pipe of claim 21, wherein in said cross-section, the first and second inner bulge members are in contact with opposite lateral ends of the one of the drip emitters.

23. The irrigation pipe of claim 21, wherein in said cross-section, lateral ends of the one of the drip emitters extend on either side of at least one of the bulge members.

24. The irrigation pipe of claim 21, wherein:
    the pipe has a base portion thickness T less than about 0.254 millimeters, and
    one or more of the bulge members have a height that extends radially away from the base portion up to about 0.254 millimeters minus T.

25. The irrigation pipe of claim 1, further comprising a first inner bulge member and a second inner bulge member that extend away from the inner face of the base portion, wherein:

in a cross-section of the irrigation pipe perpendicular to the axis (X) and intersecting one of the drip emitters, the first and second inner bulge members are in contact with the one of the drip emitters.

26. The irrigation pipe of claim 1, wherein the plurality of bulge members are formed of material for strengthening the base portion.

27. T The irrigation pipe of claim 1, wherein the plurality of bulge members each form a rib that extends on the outer face of the base portion.

28. An irrigation pipe extending along a central longitudinal axis (X), the irrigation pipe comprising:
   a pipe wall having an inner face and an outer face opposite the inner face, the inner face defining a passage of the irrigation pipe about the central longitudinal axis (X);
   a first bulge member protruding from the outer face of the pipe wall, the first bulge member extending in a direction along to the central longitudinal axis;
   a second bulge member protruding from the outer face of the pipe wall, the second bulge member extending in a direction along to the central longitudinal axis, the second bulge member defining a circumferential gap with the first bulge member; and
   a drip emitter mounted within the passage, on the inner face of the pipe wall.

29. The irrigation pipe of claim 28, further comprising a third bulge member, the third bulge member protruding from the inner face of the pipe wall.

30. The irrigation pipe of claim 28, wherein the pipe wall has a thickness defined between the inner face and the outer face, the thickness of the pipe wall being about 0.254 millimeters, wherein the first bulge member protrudes about 0.254 millimeters from the pipe wall in a direction perpendicular to the central longitudinal axis.

31. The irrigation pipe of claim 28, wherein the first bulge member is located generally above the drip emitter.

32. The irrigation pipe of claim 28, wherein the first bulge member is located generally above a peripheral lateral side of the drip emitter.

33. An irrigation pipe having an interior and an exterior, the irrigation pipe extending along a central longitudinal axis (X) disposed within the interior of the irrigation pipe, the irrigation pipe comprising:
   a pipe wall having an inner face and an outer face opposite the inner face, the inner face directed towards the interior of the irrigation pipe, the outer face directed towards an exterior of the irrigation pipe;
   a first bulge member protruding from the outer face of the pipe wall, the first bulge member extending along the central longitudinal axis (X);
   a second bulge member protruding from the outer face of the pipe wall, the second bulge member extending along the central longitudinal axis (X), the second bulge member defining a circumferential gap with the first bulge member; and
   a drip emitter mounted within the interior, on the inner face of the pipe wall.

34. The irrigation pipe of claim 33, further comprising a third bulge member, the third bulge member protruding from the inner face of the pipe wall.

35. The irrigation pipe of claim 33, wherein the pipe wall has a thickness defined between the inner face and the outer face, the thickness of the pipe wall being about 0.254 millimeters, wherein the first bulge member protrudes about 0.254 millimeters from the pipe wall in a direction perpendicular to the central longitudinal axis.

36. The irrigation pipe of claim 33, wherein the first bulge member is located generally above the drip emitter.

37. The irrigation pipe of claim 33, wherein the first bulge member is located generally above a peripheral lateral side of the drip emitter.

* * * * *